Jan. 21, 1958 W. R. SCHACK ET AL 2,820,709
PREPARATION OF COOKED COMMINUTED MEATS
Filed April 1, 1954 2 Sheets-Sheet 1

WARREN R. SCHACK
ROBERT H. MAHER
*INVENTORS*

BY R. G. Story

ATTORNEY

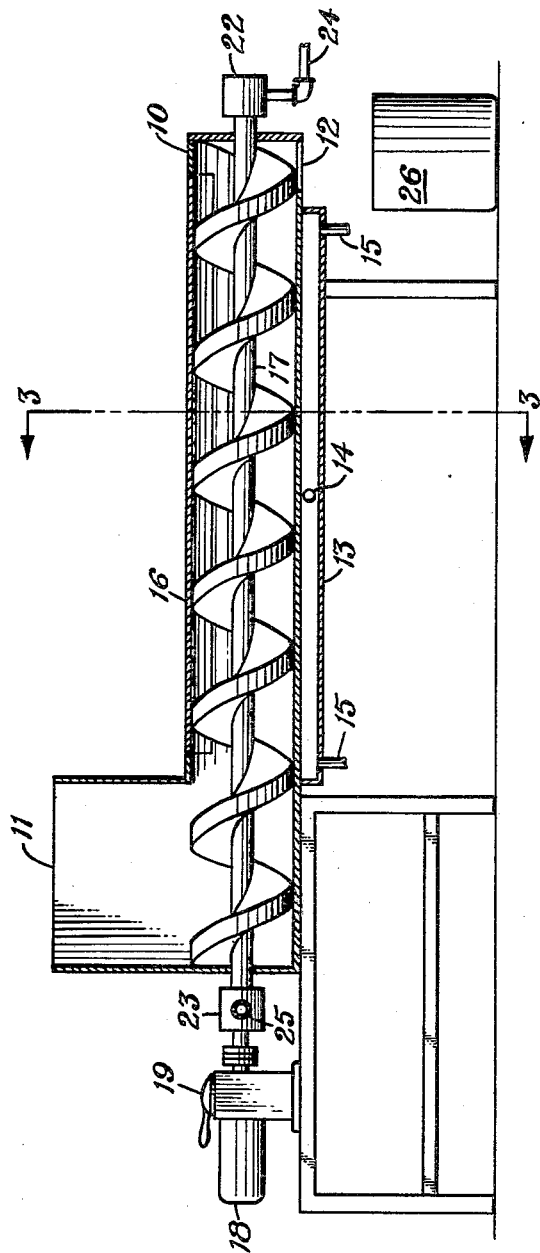

United States Patent Office

2,820,709
Patented Jan. 21, 1958

2,820,709

PREPARATION OF COOKED COMMINUTED MEATS

Warren R. Schack and Robert H. Maher, Chicago, Ill., assignors to Swift & Company, Chicago, Ill., a corporation of Illinois Application April 1, 1954, Serial No. 420,364

4 Claims. (Cl. 99—108)

The present invention relates to a process for preparing canned meats.

While the present invention has broader applications, it is particularly adapted for the preparation of canned meats for babies and young children. The traditional method for providing meats for youngsters has been by scraping portions from pieces of meat in the home, which scrapings were then cooked for consumption. Within recent years there has been placed on the market various canned comminuted meats which were cooked either before or during the canning process, or both, and thus were ready to serve by merely heating the contents of the can.

The big problem in preparing such canned products has been to produce a product which would have the flavor of a freshly roasted meat as contrasted to meats having a boiled flavor and/or typical canned flavor. This general problem is present in practically all canned meat operations.

Because of the necessity of having the product in the can sterile so that it will keep without spoilage, the general practice is to heat the product sufficiently after the can has been sealed to create this sterile condition in the can. While from a theoretical point of view the problem might be handled in other ways, from a practical point of view this has proven to be the most feasible. It is this heating which, in addition to the cooking before canning, has been thought to give the meat the typical boiled flavor which the prior art has not satisfactorily overcome by any previous precanning processing. The principal object of the present invention is the overcoming of this difficulty and the producing of a canned product which more nearly exhibits the characteristic flavor of freshly roasted meats.

Another problem that has been encountered, and which it is an object of this invention to overcome, is the production of a product which has the desired, or necessary, consistency, but which does not have a displeasing appearance. Preferably the product per se must include sufficient liquid content to give a moist appearance and a juicy texture to the taste. In the past, products of this nature have been such as to stratify upon standing, or to be mushy, stringy or dry to the taste.

Following the practices of the present invention, the canned product does not exhibit this excessive stratification of broth and meat or result in a mushy, stringy or dry product. The consistency of the meat is such that for all practical purposes the meat has absorbed all the broth. This not only avoids the appearance of stratification, but causes the broth to be ingested along with the meat. A mushy, stringy or dry appearance is likewise eliminated. By reason of the foregoing, it would be apparent that the quantities of each given to the child with each serving will be substantially constant.

In some instances the stratification found in prior practices would be accompanied by a solidification into a block of the non-liquid contents of the can. Such blocks are not easily broken down and do not receive favorable consumer acceptance. An advantage of the present invention is that product produced in accordance therewith will not tend to further solidify upon processing to create such blocks but instead results in distinct particulation of the meat.

Another advantage of the invention is that the contents of the can have the appearance and masticatory consistency of meat, as distinguished from solidified clumps and/or mushy, stringy, dry textures. At the same time the particles are readily frangible, whereby they are easily digested even by those such as children who might have difficulty with meat in the usual solid form.

In some prior practices the product is broken into smaller pieces after cooking to provide uncooked faces which it was contemplated would enable the product to absorb the broth. This is not necessary with the practices of the present invention. Yet, as previously explained we achieve a mosit appearance and juicy texture.

A further object of the invention is to provide a method for continuously manufacturing the product. Screw conveyors have been used in the past for cooking foods of a soup-like consistency. In these processes, the shell about the conveyor is heated, as may be the screw, and the product which fills, or substantially fills, the conveyor is moved along by the screw. However, when this has been tried with comminuted meats in a relatively dry form, the product just jams in the screw and rotates in place rather than being moved along by the screw. The method we have devised enables such a product to be cooked and seared without the jamming previously encountered. This permits the use of such a cooker in an aseptic canning process in which the cooking in the sealed can to accomplish commercial sterilization can be avoided.

Additional objects and advantages will become apparent from the following description taken in conjunction with the drawings in which:

Figure 2 is a sectional elevation of an apparatus for the searing and coagulation of the meat preparatory to the step of canning that product.

Figure 1:
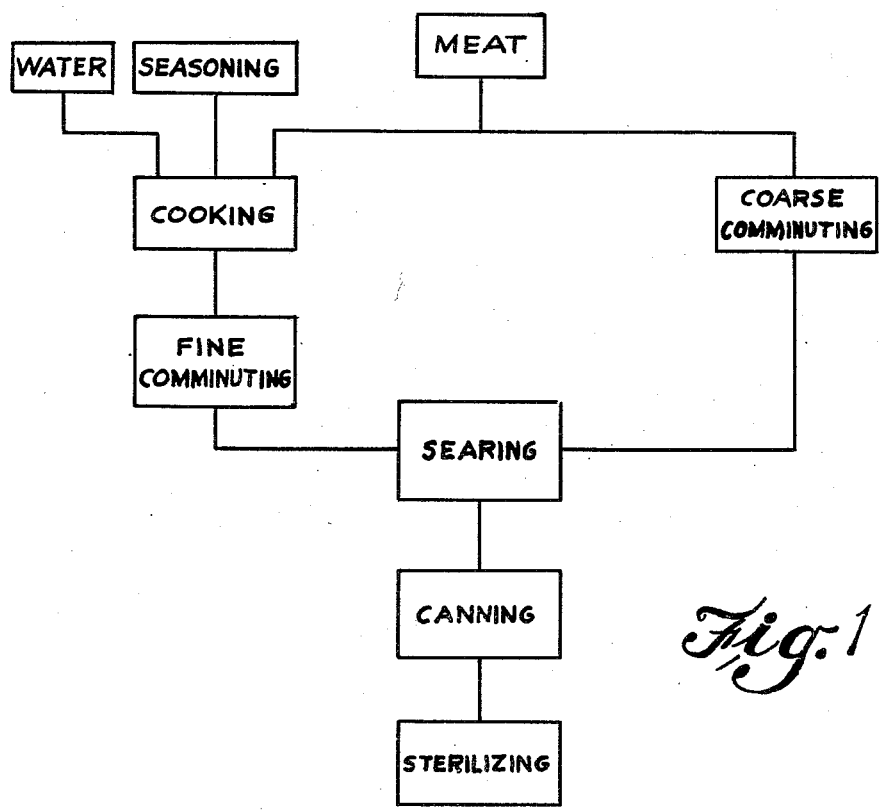
Figure 1 is a diagrammatic representation of a process of preparing canned product in accordance with the present invention.

The general process for preparing the meat for canning is illustrated in Figure 1. Here it will be seen that the meat is divided into two portions. One portion of the meat is thoroughly precooked with suitable seasonings and is finely comminuted by the use of cutters, mills, or disintegrators of theh type common to the packing industry to produce thoroughly uniform mixture of fine particles of comminuted cooked meat. The amount of added water is such that the portion when cooked will contain a broth which by weight will be at least equal to the weight of the meat solids.

A second portion of the meat is coarsely comminuted as for example by grinding it through a hasher plate having appropriately sized openings. To a great extent the size of the particles of the finished product will be a function of the size of the particles of the coarsely comminuted meat, and thus the size of the openings in the hasher plate will be adjusted in accordance with the desired size of the finished particles.

Figure 3:
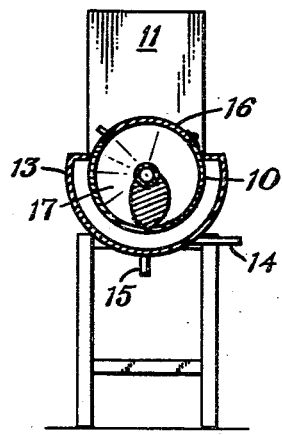
Figure 3 is a section taken at line 3—3 of Figure 2.

The two portions are then brought together and seared on a suitably heated surface such as in apparatus similar to that indicated in Figure 3. In some instances the finely comminuted portion may be added to the coarsely comminuted portion after the searing of the latter has commenced. During the period of searing, the mixture of the two portions is continuously blended so as to bring all of the comminuted meat into repeated contact with the searing surface. As the surface protein of the coarsely comminuted portion coagulates, the finely comminuted portions of the meat adhere to the surface of the coarse portions to build up these coarse potrions and at the same time protect them somewhat from the heat of the searing surface.

Preferably the searing takes place in a semi-enclosure. The liquid, primarily from the finely comminuted portion, produces a steam atmosphere within this semi-enclosure. The searing which takes place in the steam atmosphere thus created inhibits the loss of the natural juices of the meat. At the same time this steam atmosphere aids and facilitates the mixing process in continuously loosening small particles of coagulated protein that tend to adhere to the searing surface. Upon being loosened, these particles are carried along with the remainder of the mixture into the final product, where they impart flavor to the mixture.

Preferably the searing is carried out only sufficiently long to coagulate the surface protein of the particles of the more coarsely comminuted meat. The inner portions of these partially cooked particles are left in a raw, or semi-raw state. Upon being seared to this extent, the mixture then is placed in the desired containers without intentionally breaking any of the particles formed, and the containers are sealed. Subsequently the containers are processed sufficiently to commercially sterilize the contents thereof.

A specific example of a process embodying the invention is found in the preparation of canned beef for young children. Following the process illustrated in Figure 1, one portion of the meat is boiled in a kettle with water and salt for one and one-quarter hours with the product reaching a temperature of between 200° F. and 210° F. This portion is then finely comminuted. After comminuting, this first portion has the following approximate composition by weight:

| | Percent |
|---|---|
| Beef solids | 13.5 |
| Moisture | 81 |
| Fat | 5 |
| Salt | 0.5 |

The second portion of the beef is ground through a hasher plate having one-quarter inch openings therein. The two portions are then thoroughly mixed in equal proportions by weight, and the resulting mixture is seared in an apparatus of the type illustrated in Figure 2.

Basically the apparatus of Figure 2 is a jacketed worm conveyor with provision for heating the worm as well as the casing of the conveyor. To this end, the casing 10 of the conveyor has an opening 11 to receive the mixture to be cooked, and an opening 12 at the other end of this casing to discharge the seared mixture. About the lower half of the casing 10 is a jacket 13 having steam inlet and outlet connections, 14 and 15 respectively. Access to the interior of the casing 10 is gained through a hinged top 16 forming a part of the casing 10.

A hollow screw conveyor 17 is journaled in the casing and is driven by a motor 18 through a variable speed reducer 19. The screw 17 is heated by passing steam through the hollow interior thereof. This is achieved by having a slip connection 22 and 23, respectively, on either end of the screw, each of which connections communicates with the hollow interior of the screw. Steam is introduced into connection 22 through a pipe 24 and discharged from connection 23 through a pipe 25.

In the present example the casing 10 is heated to a temperature of about 225° F. and the screw 17 is heated to a temperature of about 165° F. The mixture of the finely comminuted and coarsely comminuted meat is slowly introduced into the cooker through opening 11.

The speed reducer is adjusted to turn the conveyor at a rate which will cause the seared product to be discharged through opening 12 at a temperature of about 160° F. The seared mixture may be discharged directly into the final containers, or may be temporarily received in an intermediate receptacle such as pan 26.

The cans, or other final containers are sealed and placed in a retort where they are processed at a temperature of between 212° F. and 240° F. until commercially sterile.

The flights of the conveyor 17 described provide a semiseal to retain a steam atmosphere in the apparatus as previously set forth. This seal is not sufficiently tight to give the effect of steamed or boiled product but does inhibit the loss of the natural meat juices. The contact searing creates a product having the taste of freshly prepared and/or roasted meat which taste is not lost in the subsequent canning. The flights of the conveyor continually blend the product as it is being seared so that the surface protein of the coarsely comminuted particle is uniformly coagulated. The raw or precooked finely comminuted ingredient is coagulated with or adheres to the surface of the coarsely comminuted ingredient.

It is important that only sufficient product is delivered to the cooker to maintain a small layer of product at the bottom of the casing 10. If this is followed, the product will proceed to flow through the casing under the action of screw 17. If more than this amount is added, the product will jam up around the screw and merely rotate in place rather than moving forward as is desired.

The foregoing specific example is for the purpose of complying with 35 U. S. C. 112, and should not be construed as imposing unnecessary limitations on the appended claims. Numerous variations may be made in the details of the foregoing specific example while continuing to follow the teachings of the invention. In the preceding specific example the discharge temperature of the seared product was given as about 165° F. This temperature might be as low as about 120° F. or as high as 200° F.

The temperature of the casing and the screw need not be as high as those given in the specific example, but in order to coagulate the protein of the meat they must be above about 130° F., and preferably are substantially higher than this. In some embodiments the casing and the screw will not both be heated.

Similarly, equal parts of the cooked finely comminuted mixture and the coarsely comminuted meat portion were used in this example. The proportions of each of these two may be varied substantially from the figure given. Also, the finely comminuted ingredients may be metered into the searing and/or cooking chamber a few seconds prior to discharge. These procedures alter the texture of the finished product, but each retains the similar desirable freshly prepared and/or roasted meat flavor. These and other similar variations are within the scope of the invention to the extent that they are not excluded by the limitations of the appended claims.

An example wherein the proportions of the finely comminuted mixture and the coarsely comminuted portion are not equal would be as follows: 16 pounds finely comminuted cooked meat prepared in the manner previously described is mixed with 10 pounds of ¼ inch chopped raw meat, 2⅜₁₀ ounces of salt and 1 pound of water. These ingredients are thoroughly mixed and fed into the intake 11 of the cooker. The jacket temperature and the screw temperature of the cooker are 235° F. and 170° F. respectively. The screw 17 of the cooker is operated at 22 revolutions per minute with the product being discharged from the cooker at a temperature of about 180° F. This product has the desirable hash-like appearance with a roasted flavor. There is substantially no liquid separation in the can.

As previously mentioned, it is not necessary that the two portions be premixed or added to the cooker at the same time. In a specific example the raw chopped product is inserted through intake 11 after the chopped product has transversed approximately ¾ of the heating surface of the cooker. An equal amount by weight of cooked finely comminuted meat (with added water) and coarsely comminuted meat, along with seasoning, is added to the cooker. The jacket temperature of the cooker is 230° F. and the screw temperature is 175° F. The discharged product from the cooker has a temperature of about 120° F. While the product produced in accordance with this example is a great improvement over the prior art practices, it does not develop the full roasted flavor of the other examples and tends to have some creamy components along with the hash-like apparance of the majority of the product. The flavor and texture is improved by adding the finely comminuted portion nearer to the intake of the chopped portion into the cooker.

The product produced in accordance with teachings of the present invention has substantially no free liquid. It has the color and flavor of roast meat. Organoleptic tests show that the product is highly desirable. Discrete particles exist which are readily frangible which give the product a pleasant texture but yet is is readily masticated by children.

We claim:

1. A method of packing meats including the steps of thoroughly cooking a first portion of said meat with added water to produce a cooked meat and broth, finely comminuting said first portion, coarsely comminuting a second portion of said meat, mixing and searing said two portions together with at least some of said broth while preventing the escape of at least the majority of the vaporized fractions thereof until the temperature of the mixed and seared product is between 120° F. and 200° F., placing said seared portions in containers, and closing and heating said filled containers to a temperature for a period of time sufficient to commercially sterilize the contents thereof.

2. The method of preparing meat preparatory to canning including the steps of thoroughly cooking a first portion of said meat with added water to produce a cooked meat and broth, finely comminuting said first portion, coarsely comminuting a second portion of said meat, and mixing and searing said two portions together with at least some of said broth while preventing the escape of at least the majority of the vaporized fractions thereof until the temperature of the mixed and seared product is between 120° F. and 200° F.

3. The method of preparing meat preparatory to canning including the steps of adding water to a first portion of raw meat in an amount by weight at least equal to said portion, slowly cooking said first portion with said added water to a temperature of between 200° F. and 210° F. to produce a cooked meat and broth, finely comminuting said first portion, coarsely comminuting a second portion of raw meat, searing said two portions together with at least some of said broth while preventing the escape of at least the majority of the vaporized fractions thereof, blending the two portions while searing, continuing said searing until the temperature of the product is between 120° F. and 200° F., and then discontinuing said searing.

4. The method of preparing meat preparatory to canning including the steps of thoroughly cooking a first portion of raw meat with added water to produce a cooked meat and broth, finely comminuting said first portion, coarsely comminuting a second portion of raw meat, and mixing and searing said two portions together with at least some of said broth at a temperature of between about 130° F. and about 235° F. while preventing the escape of at least the majority of the vaporized fractions thereof.

References Cited in the file of this patent

UNITED STATES PATENTS

| | | |
|---|---|---|
| 1,240,165 | Balzari | Sept. 18, 1917 |
| 1,565,283 | MaBee | Dec. 15, 1925 |
| 2,136,106 | Kern | Nov. 8, 1938 |
| 2,182,211 | Paddock | Dec. 5, 1939 |
| 2,440,168 | Cross | Apr. 20, 1948 |
| 2,534,648 | Wilbur | Dec. 19, 1950 |
| 2,535,405 | Fulton | Dec. 26, 1950 |
| 2,776,216 | Thomas | Jan. 1, 1957 |
| 2,779,681 | Sell et al. | Jan. 29, 1957 |